(12) United States Patent
Heinzemann et al.

(10) Patent No.: US 12,462,574 B2
(45) Date of Patent: Nov. 4, 2025

(54) METHOD AND DEVICE FOR EVALUATING AN IMAGE CLASSIFIER

(71) Applicant: Robert Bosch GmbH, Stuttgart (DE)

(72) Inventors: Christian Heinzemann, Ludwigsburg (DE); Christoph Gladisch, Renningen (DE); Jens Oehlerking, Stuttgart (DE); Konrad Groh, Stuttgart (DE); Matthias Woehrle, Bietigheim-Bissingen (DE); Michael Rittel, Markgroeningen (DE); Oliver Willers, Korb (DE); Sebastian Sudholt, Besigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 565 days.

(21) Appl. No.: 17/790,578

(22) PCT Filed: Feb. 8, 2021

(86) PCT No.: PCT/EP2021/052931
§ 371 (c)(1),
(2) Date: Jul. 1, 2022

(87) PCT Pub. No.: WO2021/165077
PCT Pub. Date: Aug. 26, 2021

(65) Prior Publication Data
US 2023/0038337 A1 Feb. 9, 2023

(30) Foreign Application Priority Data
Feb. 17, 2020 (DE) ..................... 10 2020 201 939.8

(51) Int. Cl.
*G06V 20/58* (2022.01)
*G06T 1/00* (2006.01)
(Continued)

(52) U.S. Cl.
CPC ............ *G06V 20/58* (2022.01); *G06T 1/0014* (2013.01); *G06V 10/25* (2022.01); *G06V 10/764* (2022.01);
(Continued)

(58) Field of Classification Search
CPC ...... G06V 20/58; G06V 10/25; G06V 10/764; G06V 10/7747; G06V 10/776;
(Continued)

(56) References Cited

U.S. PATENT DOCUMENTS 10,725,475 B2 * 7/2020 Yang ...................... G08G 1/167
10,937,173 B2 * 3/2021 Ali Akbarian ....... G06V 10/776
(Continued)

FOREIGN PATENT DOCUMENTS

| CN | 106845374 A | 6/2017 |
|---|---|---|
| DE | 112019000048 T5 | 1/2020 |

(Continued)

OTHER PUBLICATIONS

International Search Report for PCT/EP2021/052931, Issued May 6, 2021.
(Continued)

*Primary Examiner* — Mia M Thomas
(74) *Attorney, Agent, or Firm* — NORTON ROSE FULBRIGHT US LLP

(57) ABSTRACT

A computer-implemented method for evaluating an image classifier, in which a classifier output of the image classifier is provided for the actuation of an at least semi-autonomous robot. The evaluation method includes: ascertaining a first dataset including image data and annotations being assigned to the image data, the annotations including information about the scene imaged in the respective image and/or about image regions to be classified and/or about movement information of the robot; ascertaining regions of the scenes (Continued)

that are reachable by the robot based on the annotations; ascertaining relevance values for image regions to be classified by the image classifier; classifying the image data of the first image dataset with the aid of the image classifier; evaluating the image classifier based on image regions correctly classified by the image classifier and incorrectly classified image regions, as well as the calculated relevance values of the corresponding image regions.

9 Claims, 4 Drawing Sheets

(51) Int. Cl.
G06V 10/25 (2022.01)
G06V 10/764 (2022.01)
G06V 10/774 (2022.01)
G06V 10/776 (2022.01)
G06V 20/64 (2022.01)

(52) U.S. Cl.
CPC ........ *G06V 10/7747* (2022.01); *G06V 10/776* (2022.01); *G06V 20/64* (2022.01); *G06V 2201/06* (2022.01)

(58) Field of Classification Search
CPC .. G06V 20/64; G06V 2201/06; G06T 1/0014; G06F 18/217; G06F 18/28
See application file for complete search history.

(56) References Cited

U.S. PATENT DOCUMENTS

| | | | | |
|---|---|---|---|---|
| 11,126,855 | B2* | 9/2021 | Kim | G06V 20/20 |
| 11,348,269 | B1* | 5/2022 | Ebrahimi Afrouzi | G01S 17/48 |
| 11,841,920 | B1* | 12/2023 | Marsden | G06N 3/045 |
| 11,854,308 | B1* | 12/2023 | Marsden | G06V 10/454 |
| 2011/0044507 | A1 | 2/2011 | Strauss et al. | |
| 2015/0235110 | A1 | 8/2015 | Curtis et al. | |
| 2016/0167226 | A1 | 6/2016 | Schnittman | |
| 2019/0205744 | A1* | 7/2019 | Mondello | G06N 3/045 |
| 2019/0262992 | A1* | 8/2019 | Kim | G05D 1/0234 |
| 2019/0362562 | A1* | 11/2019 | Benson | G06V 10/82 |
| 2020/0183035 | A1* | 6/2020 | Liu | G06N 20/00 |
| 2020/0234113 | A1* | 7/2020 | Liu | G06N 7/01 |
| 2020/0302241 | A1* | 9/2020 | White | G06V 10/772 |
| 2020/0349441 | A1* | 11/2020 | Zhang | G06N 3/047 |
| 2021/0078168 | A1* | 3/2021 | Mehnert | G05D 1/021 |
| 2021/0197712 | A1* | 7/2021 | Korjus | B60P 3/007 |
| 2021/0390419 | A1* | 12/2021 | Rottmann | G06N 3/088 |
| 2022/0101101 | A1* | 3/2022 | Mathur | G06N 3/045 |
| 2022/0292349 | A1* | 9/2022 | Stoll | G06N 3/045 |
| 2022/0308592 | A1* | 9/2022 | Go | G05D 1/0214 |
| 2022/0406046 | A1* | 12/2022 | Mummadi | G06V 10/82 |
| 2024/0185555 | A1* | 6/2024 | Chen | G06V 10/82 |

FOREIGN PATENT DOCUMENTS

JP 2009282760 A 12/2009
WO 2019175012 A1 9/2019

OTHER PUBLICATIONS

Althoff, "Reachability Analysis and Its Application to the Safety Assessment of Autonomous Cars," Dissertation, Technical University München, 2010, pp. 1-121. <https://mediatum.ub.tum.de/doc/963752/642175.pdf>.

Byrd et al., "What Is the Effect of Importance weighting in Deep Learning?," Cornell University, 2019, pp. 1-15.

Ohn-Bar et al., "Are All Objects Equal? Deep Spatio-Temporal Importance Prediction in Driving Videos," Pattern Recognition, vol. 64, 2017, pp. 425-436.

* cited by examiner

METHOD AND DEVICE FOR EVALUATING AN IMAGE CLASSIFIER

FIELD

The present method relates to a method for evaluating an image classifier, a method for training an image classifier, a method for operating an image classifier, a training device, a computer program, an actuation system, and a machine-readable memory medium.

BACKGROUND INFORMATION

"Reachability Analysis and its Application to the Safety Assessment of Autonomous Cars", Matthias Althoff, Dissertation, Technical University München, 2010, describes a method for determining reachable ranges of an autonomous vehicle.

Image classifiers constitute a key technology for operating at least semi-autonomous and/or mobile robots. It has been shown that the best classifications performance is currently provided by data-trained image classifiers, in particular neural networks.

However, the examination of these image classifiers trained on the basis of machine learning is difficult because it is often not obvious how an image classifier reaches its classification. In particular in safety-critical applications, this characteristic makes it difficult to determine with certainty that a product that includes an image classifier trained on the basis of machine learning is safely acting in its environment.

An advantage of the method in accordance with the present invention is that it provides an insight into the method of functioning of an image classifier. In particular, the method of the present invention enables the ascertainment of elements of an image that are relevant from a safety standpoint and that the image classifier is to detect. This makes it possible to gain an insight into the accuracy of the classifications of the classifier. Conversely, the method may be used to determine whether a mobile robot that performs its navigation based on information of an image classifier is safe enough to allow for its operation.

SUMMARY

In a first aspect, the present invention is directed to a computer-implemented method for evaluating an image classifier, in which a classifier output of the image classifier is provided for the actuation of an at least semi-autonomous robot (100, 220). In accordance with an example embodiment of the present invention, the method for the evaluation includes the following steps:

Ascertaining (300) a first dataset, the first dataset including images, and annotations being assigned to the images, the annotations including information about the scene imaged in the respective image and/or about image regions to be classified, and/or about movement information of the robot (100, 220);

ascertaining (301) regions (212) of the scenes that are reachable by the robot (100, 220) based on the annotations;

ascertaining (302) relevance values for image regions to be classified by the image classifier;

classifying (303) the images of the first image dataset with the aid of the image classifier;

evaluating (304) the image classifier based on image regions correctly classified by the image classifier (60) and incorrectly classified image regions, as well as the calculated relevance values of the corresponding image regions.

An image classifier may be understood as a device which is characterized by being capable of receiving images (also: image data) and generating a classification output that characterizes the image data or parts thereof. For example, an image classifier may be used to determine in which parts of an input image objects are located. In a mobile robot such as an autonomous vehicle, an image classifier is able to be used so that it detects other road users. The corresponding classifier output may then be utilized to actuate the robots. For instance, with the aid of the classifier output, a trajectory may be ascertained along which the robot moves through its environment without collisions. In other words, the image data preferably show an environment of the robot.

In addition to the object detection, an image classifier may also be used for other classification tasks such as a semantic segmentation. In this case, the image classifier classifies every desired point in an input image, e.g., every pixel of a camera image, into a desired class. For example, this may be used to enable a mobile robot to detect the boundaries of the drivable region of the environment based on an input image, and to plan a trajectory on that basis.

An image classifier may include a model from the field of machine learning such as a neural network. The model is able to be used to classify the input of the image classifier. In addition, the image classifier can include pre- and/or post-processing methods. In the case of an object detection, a post-processing method may be a non-maximum suppression, for example, which can be used to fuse different bounding boxes of the same objects.

Different types of images are able to be used as input data for an image classifier, in particular sensor data, e.g., from a camera sensor, a radar sensor, a LIDAR sensor, an ultrasonic sensor, or an infrared camera sensor. Audio recordings of microphones, too, may be represented as image data and used as input for an image classifier, e.g., in the form of spectral images. It is furthermore possible to combine multiple types of sensor data in order to obtain an input datum for the image classifier.

As an alternative, in accordance with an example embodiment of the present invention, the image data are able to be generated synthetically with the aid of computer-assisted measures. For example, it is possible to calculate or render images based on physical models.

The images used as input for the image classifier can be directly recorded by a sensor and forwarded to the image classifier. Alternatively, image data are able to be recorded or generated prior to the classification and subsequently buffer-stored, preferably on a storage medium, before being forwarded to the image classifier. Hard disks, flash drives or solid state disks, in particular, are able to be used for this purpose. It is also possible to store image data in a dynamic memory.

Based on the output of the image classifier, an actuation signal is ascertainable which can be used for an actuation of an at least semi-autonomous robot. An at least semi-autonomous robot may be understood as a robot which at least intermittently carries out a task in an autonomous manner without being controlled by a person. To this end, the robot may use sensors and actuators, for example. A semi-autonomous robot, for instance, may be an autonomously driving vehicle, a lawn mower robot, a vacuum robot or a drone. In the following text, the term robot denotes an at least semi-autonomous robot.

The present method in accordance with an example embodiment of the present invention acquires a first image dataset with the aid of which the evaluation is able to be performed. An image dataset may be understood as a set of image data, it being possible that specific information is assigned to the image data in the form of annotations. An annotation of an image datum denotes a set of information that describes the image datum or parts thereof or which includes further additional information about the image.

Image data may image scenes that can include objects. In the case of image data recorded by one or multiple sensor(s), a scene may describe a situation of the real world, in particular the environment of the robot. For instance, a scene may represent a number of objects in a street situation. Objects may be understood as other road users in this case, for example.

In the case of synthetically generated image data, a scene may be understood as the virtual world based on which an image datum was synthesized. The objects may be understood as virtual elements of the scene in such a case.

It is possible to allocate annotations to image data, the annotations possibly including information about the scene and/or the image regions imaged in each case. For example, an annotation can include a number of bounding boxes, which describe the position of objects imaged in the image datum. Alternatively or additionally, it is possible that the annotation includes pixel-accurate information with regard to the class of a pixel (that is, a semantic segmentation) of the image datum.

Alternatively or additionally, it is possible that an annotation includes information of weather and/or environmental influences which prevailed at the time when the specific image datum was recorded, e.g., rain, sun radiation, time of day or the condition of the ground.

Alternatively or additionally, it is possible that an annotation includes information about the scene in which the image was recorded. In the case of a real scene, for example, the annotation may include information about the relative position of the sensor with regard to other objects of the scene. For instance, this information may later be used to determine the three-dimensional position of an object imaged in an image datum (e.g., a camera image) in a two-dimensional form. It is also possible as an alternative that the three-dimensional position information of objects in the scene is directly included in the annotation, e.g., in the form of a relative vector from the sensor to the object.

The first image dataset for the present method may preferably be selected in such a way that a system is used for the recording that corresponds to or resembles the later robot. For example, to evaluate the image classifier to be used in an autonomous vehicle, the first image dataset may be recorded in such a way that a test driver controls the vehicle so that the sensors of the vehicle are able to record the desired image data. It is alternatively possible that the first dataset is recorded by a vehicle that has the same sensor development as the vehicle for which the image classifier is to be evaluated.

As an alternative, it is possible that the first image dataset is synthetically generated with the aid of a computer-based model. The model may preferably be selected in such a way that it is at least similar to the robot in terms of its form, physical properties and sensor system. In this case, the scene may be understood as the combination of the positioning and the characteristics of virtual objects with whose aid synthetic image data are able to be generated.

Alternatively, the first image dataset may also be obtained from existing sources. For example, a series of freely accessible datasets which may be used for evaluating an image classifier is available on the Internet.

The annotations for the present method are able to be generated either manually or in an at least partly automated manner for the different image data. The annotations preferably include relative information with regard to the elements of an image datum to be classified and the system that is or was used for the recording. For example, a vehicle may be designed in such a way that it is capable of recording a camera-based image dataset, which may subsequently be used to evaluate an image classifier later to be used in the vehicle or in a vehicle having a similar design. In this case, for example, the annotations of the image data may include bounding boxes of objects to be detected in the environment of the vehicle. In addition, they may include information with regard to the position of the objects to be detected in a specific image datum in relation to the vehicle. This information can later be used to determine the relevance value of an object.

As an alternative, in synthetically generated image data, the model data of the synthetic model may be directly adopted as information in the annotations. The data described in the previous paragraph are able to be correspondingly simulated with the aid of a computer, for example. A virtual model of the sensor is required for this purpose and also its position in the simulated scene. This position or these positions of simulated objects to be later detected by the image classifier is/are able to be directly included in the annotation in this case.

The annotations preferably also include information pertaining to the velocity of the robot, the acceleration, the steering angle, the drive positions, or the planned trajectory, for example, and each piece of information images values that are or were present at the time when an image datum is/was recorded. This information, to the extent that it is useful, is preferably included in the annotation also for the objects of the scene.

With the aid of the movement information, it is then possible to ascertain regions of a scene that the robot could have reached in a certain time at the time of the recording. These regions are able to be ascertained with the aid of the time to collision with other objects and/or the time to react and/or the time to brake and/or the time to steer and/or the time to kick down, for example. The regions may be understood as safety-critical regions in which the robot must be able to identify other objects with great accuracy and reliability in order to plan a safe trajectory, for instance.

An image region to be classified may be understood as at least part of an image datum for which the image classifier is meant to predict a certain object or a certain class that is imaged by the image region. In the case of an object detection, the regions to be classified may be understood as images of the objects meant to be detected by the image classifier. In the case of a semantic segmentation, the image regions may be understood as the pixels of an image, each pixel being able to be assigned to an object.

Relevance values may then be assigned to the image regions to be classified. Each region to be classified is preferably given a relevance value. In this context, a relevance value may be understood as a value that indicates to what extent an incorrect classification of the image classifier for this image region may become critical for the behavior of the robot using the image classifier. For example, image regions which image objects located at a very great distance from the robot can be assigned low relevance values. Image regions that image objects close to the robot, on the other hand, may be given high relevance values because their incorrect classification would have a greater effect on the robot.

Relevance values may be imaged by scalar values. A relevance value can be binary or real-valued in this context.

For all or parts of the image regions to be classified, it may then be determined whether the image classifier has classified them correctly. The evaluation of the image classifier may preferably be performed on the basis of the relevance values of the incorrectly classified image regions. For example, the evaluation may be carried out in the form of a sum or an average of the relevance values of the incorrectly classified regions.

An advantage of this approach is that a numerical or objective value is ascertainable, which may be used to arrive at a decision as to whether the image classifier is able to be used as part of the actuation of the robot. This allows for a differential insight into the method of functioning of an afore-described image classifier. This is a considerable improvement because especially image classifiers based on machine learning exhibit a black box behavior that can otherwise not be satisfactorily understood.

In the first aspect of the present invention, it is furthermore possible that the image regions to be classified are assigned to an object in each case.

The advantage of this approach is that the relevance of an image region may reflect the relevance of the object. This makes it possible to evaluate the relevance of objects in a scene based on the image regions. In return, this provides detailed insight into the behavior of the image classifier for the detection of objects in a scene.

In a first aspect of the present invention, it is furthermore possible that the step of ascertaining the regions reachable by the robot is based on movement information of the robot.

The movement information of the robot such as the velocity or acceleration makes it possible to determine to which regions of the scene the robot is plausibly able to move in the first place. Objects in these regions should therefore be predictable with high accuracy in order, for instance, to actuate the robot in such a way that it will not collide with the objects. The movement information, if available, may be extracted from the annotation or be estimated with the aid of the image data. For example, multiple consecutive images of the first image dataset can be used to estimate the velocity of the robot. In the case of stationary production robots, information about the reachable regions of the robot may also be obtained from data sheets of the robot, for instance.

The advantage of this approach therefore consists of being able to determine regions within which the image classifier should be able to detect objects in a reliable manner. Since other regions of the scene may be less relevant or irrelevant, this method therefore provides detailed and target-oriented insight into the workings of the image classifier, and the evaluation allows for a better estimation of the detection capability (performance) of the image classifier. This is because conventional methods estimate the detection capability of an image classifier in all image regions of an image. Via the ascertained reachable regions, it is therefore possible to evaluate the detection capability of the robot with regard to a safe and fault-free operation in a much better manner.

In the first aspect of the present invention, it is furthermore possible that the step of ascertaining the relevance values includes the following steps:

Ascertaining depth information of the objects;

determining a relationship between object positions and reachable regions based on the ascertained depth information;

ascertaining the relevance values based on the relationship.

The advantage of this approach is, for example, that a relevance value not equal to zero may be assigned to image regions only if the corresponding objects are actually able to interact with the robot in a safety-critical manner. From the aspect of safety-critical measures, for instance, the detection of a pedestrian is irrelevant for the trajectory planning of a robot if the robot is unable to drive faster than 30 km/h, for example, and the pedestrian to be detected is located at a distance of more than 500 m, for instance. In return, the behavior of the image classifier with regard to the safety of the robot is able to be evaluated much more precisely with the aid of the introduced method.

In the first aspect of the present invention, it is furthermore possible that the step of evaluating the image classifier includes the determination of an evaluation measure, the present method for evaluating the image classifier furthermore including the following additional step:

follow-up training of the image classifier based on a second image dataset if the evaluation measure is worse than a predefined evaluation threshold value.

For example, the evaluation measure may be selected in such a way that it becomes progressively greater the worse the performance of the image classifier. In this case, follow-up training would thus be undertaken when the evaluation measure is greater than the evaluation threshold value.

As described above, the evaluation measure may be the sum or the average of the relevance values of all incorrectly classified image regions, for example.

Follow-up training of the image classifier may be understood as a method that adapts the parameters of the image classifier with the aid of the second image dataset in such a way that the detection accuracy of the image classifier is further improved with the aid of the second image dataset. To this end, the second image dataset may again include annotations that are able to be used to adapt the parameters with the aid of a supervised learning method. The second image dataset may be ascertained using the same method as the first image dataset. In addition, it is possible that the second image dataset includes at least portions of the image data and/or annotations of the first image dataset.

An advantage of this approach is that the safety and thus the detection performance of the robot is able to be considerably increased as a result of the improved detection accuracy. This leads to a better overall system, which functions better and more reliably in the real world.

In a first aspect of the present invention, it is furthermore possible that the described steps are iteratively repeated until a predefined number of iterations has been carried out and/or the predefined evaluation threshold has been undershot.

An advantage of this approach is that the detection performance of the image classifier is able to be improved until the detection performance is sufficient to operate the image classifier in a real product. In addition, this approach also offers the advantage that a barely adequate evaluation result can be improved further and a certain safety buffer with regard to the detection accuracy of the image classifier be achieved in this way. It is also possible that the image classifier receives follow-up training using different second image datasets between the iterations in an effort to further increase the detection performance.

In the introduced iterative approach, image data of the first image dataset can be used for at least a portion of the second image dataset. In each iteration, images are preferably able to be removed or exchanged from the first image dataset. In addition, images may be removed from the second image dataset or exchanged in each iteration. If an exchange of image data takes place in the first and/or second image dataset, then the annotations may preferably be modified in such a way that they include information that relates to the new image data.

In the first aspect of the present invention it is furthermore possible that the follow-up training of the image classifier is carried out based on relevance values of image regions of the second image dataset.

The advantage of this approach is that image regions that are less relevant or irrelevant from the evaluation point of view are able to be weighted in the training in such a way that they have little or no effect on the training of the image classifier. This results in easier training of the image classifier, which in return considerably increases the detection performance of the image classifier. This leads to an increase in the performance of the overall system if an image classifier trained in this way is used as part of the control of a robot.

In the following text, embodiments of the present invention will be described in greater detail with reference to the figures.

DETAILED DESCRIPTION OF EXAMPLE EMBODIMENTS

Figure 1:
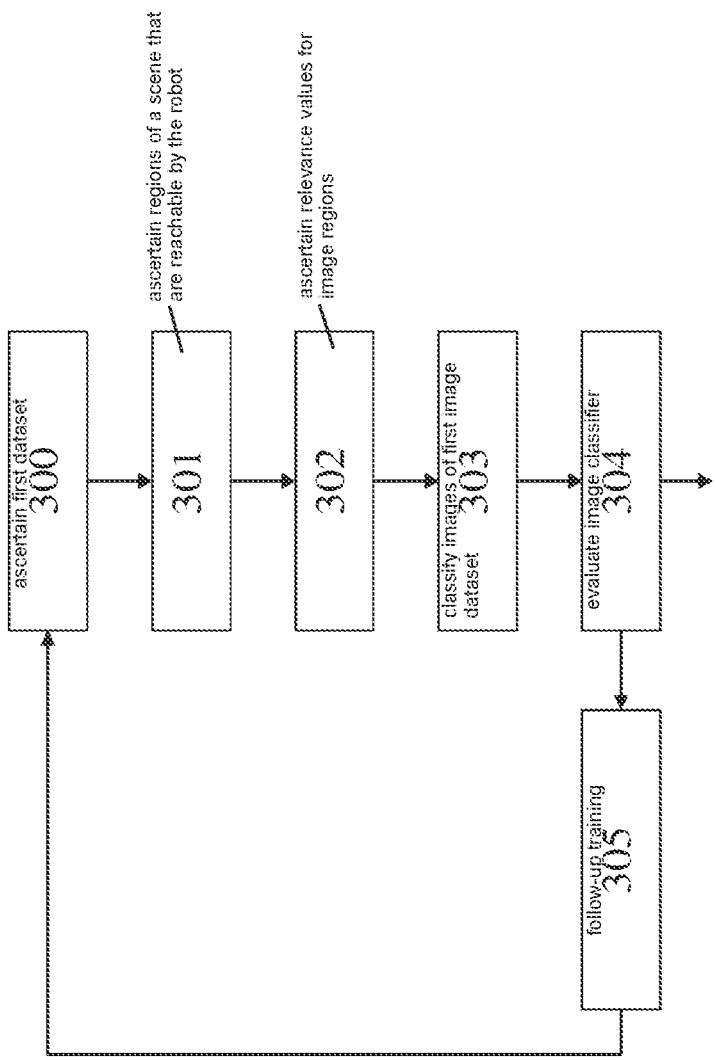
FIG. 1 shows schematically, the flow diagram of a method of evaluating an image classifier in accordance with an example embodiment of the present invention.

FIG. 1 shows a flow diagram of a method for evaluating an image classifier (60). In this exemplary embodiment, the image classifier (60) is designed in such a way that it is able to detect vehicles in expressway situations, and the classifier output (y) includes bounding boxes.

In a first step (300), an image dataset is ascertained. For example, this may be realized with the aid of a test vehicle in which a camera suitable for recording image data is installed. The image dataset in this exemplary embodiment shows image data of expressway situations in which vehicles can be detected. Moreover, in this exemplary embodiment, vehicle data such as the velocity and steering angle that prevail at the respective recording instant of an image are assigned to the image data in the recording of the image dataset. As an alternative, these vehicle data may also be estimated from the recorded image data after the recording.

Subsequently, a person may manually provide the image dataset ascertained in this way with annotations. As an alternative, instead of the manual annotation, it is also possible to render a semiautomatic annotation with the aid of a second image classifier. In such a case, the second image classifier may suggest annotations, which are checked by a person and are possibly modifiable. As an alternative, it is furthermore possible that the second image classifier implements the annotations in a fully automated manner by making direct use of the suggestions of the second image classifier as annotations.

In this exemplary embodiment, the generated annotations include information relating to the other vehicles in the recorded image data, bounding boxes of the vehicles in the image, and also to the installation position and orientation of the camera sensor. In further exemplary embodiments it is possible that the annotations include additional three-dimensional information such as the position, orientation, velocity and/or driving direction of the vehicles to be detected.

In a second step (301), the regions that the test vehicle would have been able to reach in a specified time at the time of the recording are then determined for the images of the image dataset. As time, the time to react may be used, for instance. Instead of the time to react, it is alternatively possible to use the time to collision, time to brake, time to steer or the time to kick down or combinations of these times, for example.

The calculation of the reachable regions is performed with the aid of the velocity information in the annotations as well as information about the position of the vehicle. The result represents information as to which regions in the scene in which the image datum was recorded the vehicle would have been able to reach in a certain time when an image datum was recorded.

In a third step (302), a relevance value is determined for the other vehicles of the image data. To this end, the three-dimensional position of the other vehicles is ascertained on the basis of the annotated bounding boxes and the installation position of the camera sensor. Alternatively, provided it is available, this information can also be directly extracted from the annotation.

The relevance value is able to be defined as 1 for all vehicles which are located in one of the regions determined in the previous step, while it is otherwise defined as 0. As an alternative, it is possible to assign a value between 0 and 1 to the vehicles if they are located outside a region determined in the previous step. It is furthermore possible as an alternative that vehicles in one of the regions determined in the previous step are also assigned a value between 0 and 1. It is moreover possible that the relevance value of an object also depends on the velocity and trajectory of the object. For example, even objects outside the reachable regions may be given a relevance value greater than 0 if they are moving toward the corresponding reachable regions, for example.

In a fourth step (303), the image classier (60) classifies the image data of the first image dataset. In the classification, a vehicle may either be detected in an image datum, that is, correctly classified, or not correctly detected.

In a fifth step (304), the detection accuracy of the image classifier (60) is evaluated. A sum of the relevance values belonging to vehicles that were not detected are able to be used as an evaluation measure. It is alternatively also possible that the mean value or the median of the relevance values may be used as an evaluation measure.

If the evaluation measure is worse than a predefined evaluation threshold value, then it is possible to perform follow-up training of the image classifier (60) in a sixth step (305) with the aid of a second image dataset. In this exemplary embodiment, it is possible, for example, that the evaluation threshold value is defined as 0. This is equivalent to the statement that all vehicles having a relevance greater than 0 must be detected. In the event that this is not the case, the image classifier will be retrained. In this case, the second image dataset is able to be ascertained according to one of the methods that may also be used for ascertaining the first image dataset. If the evaluation measure satisfies the evaluation threshold value, then the image classifier (60) is able to be released.

In further exemplary embodiments, it is possible that the steps of the evaluation of the image classifier (300, 301, 302, 303, 304, 305) are iteratively repeated until the evaluation measure satisfies the threshold value.

In further exemplary embodiments, it is possible that the steps of evaluating the image classifier (300, 301, 302, 303, 304, 305) are iteratively repeated until a previously defined number of iterations has been carried out.

Figure 2:
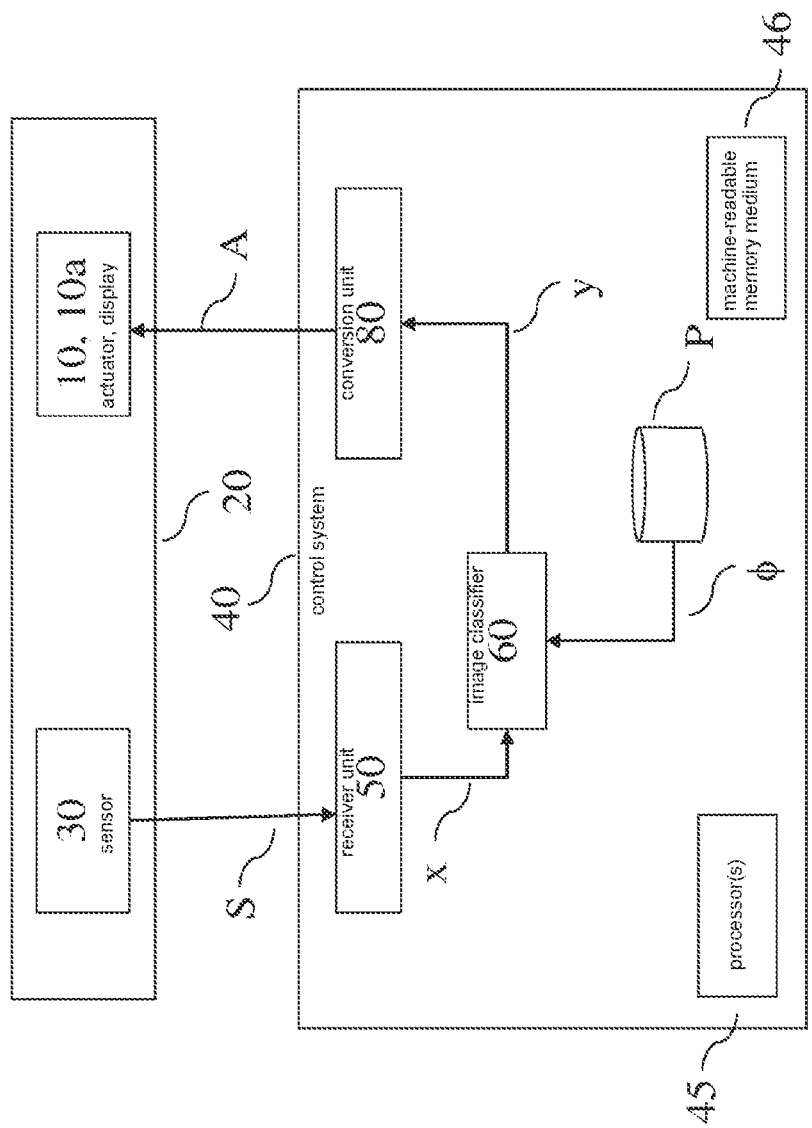
FIG. 2 shows schematically, a control system in accordance with an example embodiment of the present invention.

FIG. 2 shows an actuator (10) in its environment (20) in an interaction with a control system (40). At preferably regular time intervals, the environment (20) is acquired by a sensor (30), in particular an imaging sensor such as a video sensor, which may also be provided as a multiplicity of sensors, e.g., a stereo camera. The sensor signal (S)—or an individual sensor signal (S) of the sensor (30) in the case of multiple sensors—is transmitted to the control system (40). The control system (40) thus receives a sequence of sensor signals (S). The control system (40) ascertains actuation signals (A) therefrom, which are transmitted to the actuator (10).

The control system (40) receives the sequence of sensor signals (S) from the sensor (30) in an optional receiver unit (50), which converts the sequence of sensor signals (S) into a sequence of input images (x) (as an alternative, each sensor signal (S) may also be directly adopted as an input image (x)). For example, input image (x) may be a cutout or further processing of the sensor signal (S). The input image (x) includes individual frames of a video recording. In other words, the input image (x) is ascertained as a function of the sensor signal (S). The sequence of input images (x) is conveyed to an image classifier (60), which, for instance, was evaluated in the same way as in the first exemplary embodiment and whose evaluation measure was below the evaluation threshold value.

The image classifier (60) is preferably parameterized by parameters ($\phi$), which are stored in a parameter memory (P) and supplied therefrom.

The image classifier (60) ascertains classifier outputs (y) from the input images (x). The classifier outputs (y) are conveyed to an optional conversion unit (80), which ascertains actuation signals (A) therefrom, which are supplied to the actuator (10) in order to actuate the actuator (10) accordingly. The classifier output (y) includes information about objects that were detected by the sensor (30).

The actuator (10) receives the actuation signals (A), is actuated accordingly and carries out a corresponding action. The actuator (10) may include an actuation logic (not necessarily structurally integrated), which ascertains from the actuation signal (A) a second actuation signal which will then be used to actuate the actuator (10).

In further embodiments, the control system (40) includes the sensor (30). In still other embodiments, the control system (40) alternatively or additionally also includes the actuator (10).

In further preferred embodiments, the control system (40) includes one or a plurality of processor(s) (45) and at least one machine-readable memory medium (46) on which instructions are stored that when executed on the processors (45), induce the control system (40) to carry out the method according to the present invention.

In alternative embodiments, a display unit (10a) is provided as an alternative or in addition to the actuator (10).

Figure 3:
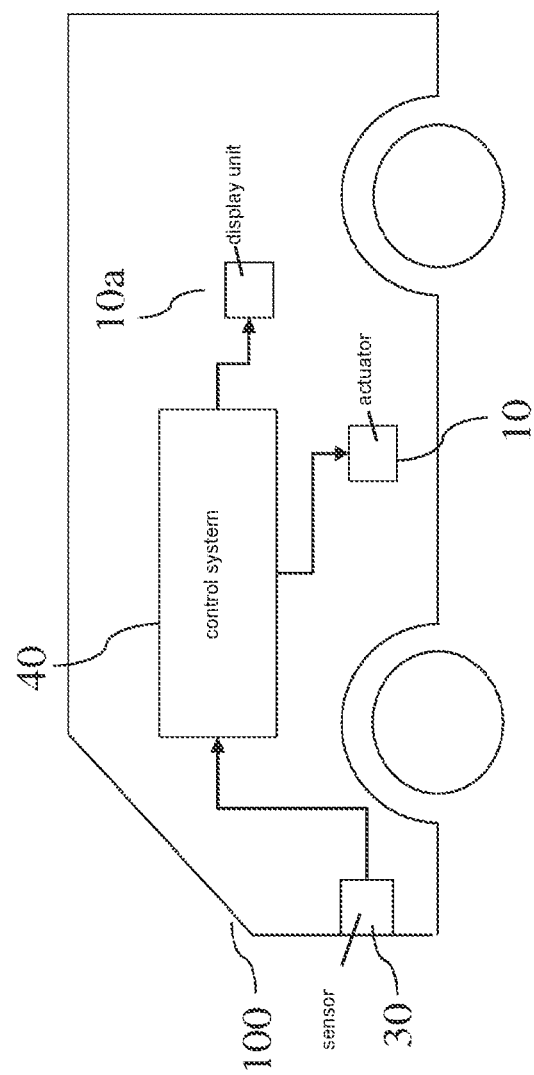
FIG. 3 shows schematically, an autonomous vehicle which is controlled by a control system, in accordance with an example embodiment of the present invention.

FIG. 3 illustrates how the control system (40) is able to be used for the control of an at least semi-autonomous robot, which is an at least semi-autonomous vehicle (100) in this instance.

For example, the sensor (30) may be a video sensor preferably installed in motor vehicle (100).

The image classifier (60) is designed to identify objects based on the input images (x).

The actuator (10), which is preferably situated in the motor vehicle (100), may be a brake, a drive or a steering system of the motor vehicle (100), for example. The actuation signal (A) is then able to be ascertained so that, for instance, the actuator or actuators (10) is/are actuated in such a way that the motor vehicle avoids a collision with objects identified by the image classifier (60), in particular if objects of certain classes such as pedestrians are involved.

Alternatively, the at least semi-autonomous robot may also involve some other mobile robot (not shown), e.g., one that moves by flying, swimming, diving or walking. For instance, the mobile robot may also be an at least semi-autonomous lawn mower or an at least semi-autonomous cleaning robot. In these cases as well, the actuation signal (A) is able to be ascertained in such a way that the drive and/or the steering system of the mobile robot is/are actuated so that the at least semi-autonomous robot prevents a collision with objects identified by the image classifier (60), for example.

As an alternative or in addition, a display unit (10a) is able to be actuated by the actuation signal (A) and the ascertained safe regions be displayed, for example. Also, in a motor vehicle (100) without automated steering, for instance, it is possible for the display unit (10a) to be actuated by the actuation signal (A) in such a way that it outputs an optical or acoustic warning signal if it is ascertained that a collision of the motor vehicle (100) with one of the objects identified by the image classifier (60) is imminent.

Figure 4:
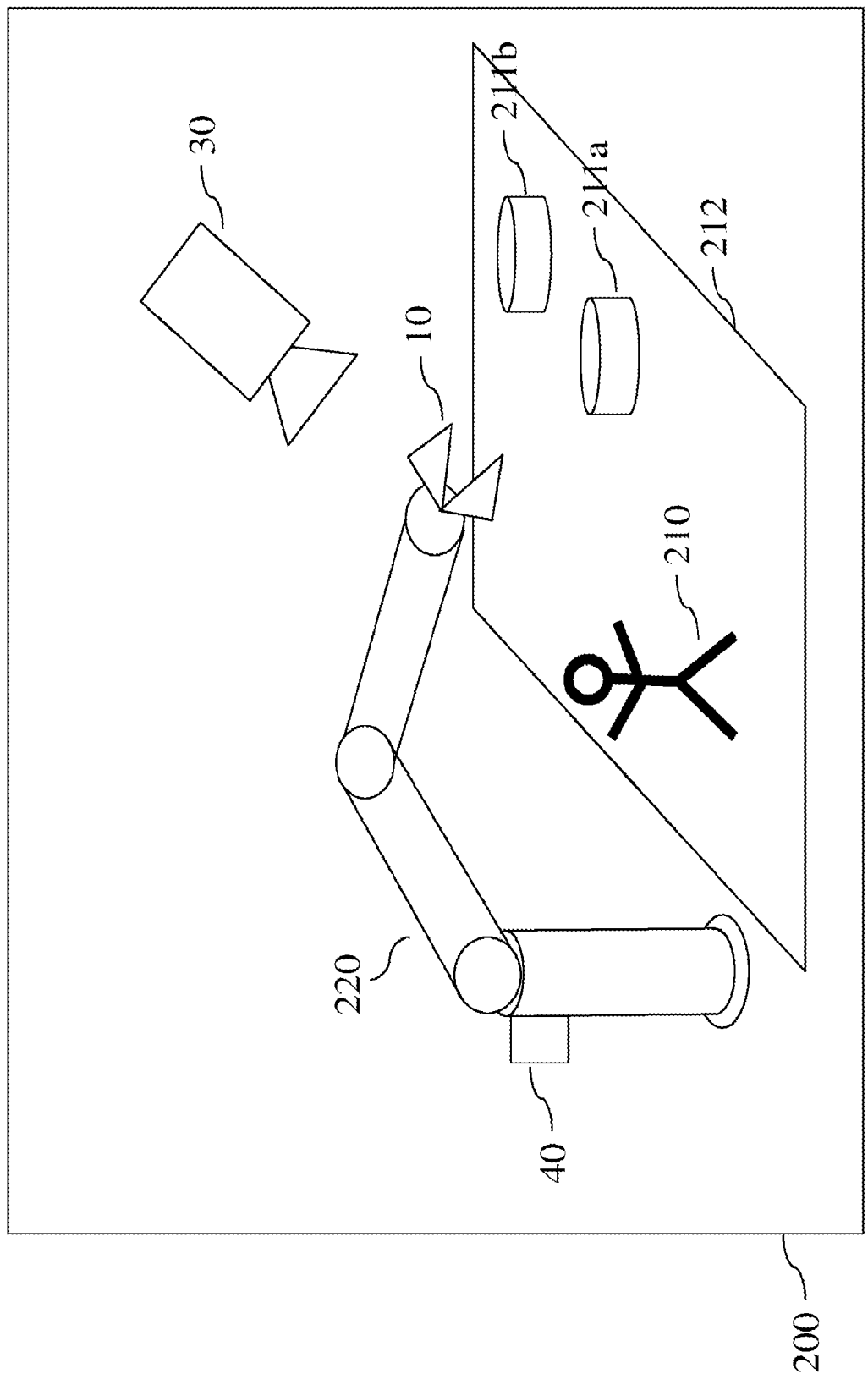
FIG. 4 shows schematically, a production robot, which is controlled by the control system, in accordance with an example embodiment of the present invention.

FIG. 4 illustrates how the control system (40) is able to be used for the control of a production robot (220), e.g., a PUMA robot, in which case it is also possible that persons (210) enter the workspace (212) of the production robot (220). It is possible in this exemplary embodiment that the control system (40) receives image data from a camera sensor (30) and uses it to actuate an actuator (10), the actuator (10) driving the movement of the production robot (220) and also a gripper at the end of the arm of the production robot (220) by which workpieces (211a, 211b) are able to be grasped.

Via the image data of the camera sensor (30) and with the aid of the included image classifier (60), the control system is furthermore able to detect persons (210) present in the workspace (212) of the production robot (220). In the event that one or more persons (210) were detected in the workspace (212), the control system (40) is able to adapt the movement of the production robot (220) in such a way that the person or the persons (210) will not be touched or injured by the production robot (220). It is optionally also possible that the movement of the production robot (220) is selected in such a way that the arm of the production robot (220) maintains a certain minimum distance from the person or persons (210) in the workspace (212).

For this exemplary embodiment, it is possible that the image classifier (60) was trained using images of persons (210) in or around the workspace (212) of the production robot (220). A first image dataset is able to be recorded to evaluate whether the production robot (220) can be operated in a safe manner, it being possible for the images of the first image dataset to also include persons (210) in or around the workspace of the production robot (220). For the evaluation, the images of the first image dataset are able to be provided with annotations in the form of bounding boxes for the persons (210) in the corresponding images, and each bounding box is furthermore assigned a relevance value. This relevance value may be defined as 1 if the corresponding bounding box shows a person (210) who is present in the workspace (212) of the production robot (220), and it may be defined as 0 in the other case.

For the evaluation, it may subsequently be specified that the sum of the relevance values of the bounding boxes of the first dataset not detected by the image classifier (60) must be 0. This is equivalent to the statement that the image classifier (60) may not incorrectly detect any person (210) within the workspace (212) of the production robot (220), whereas this is not a requirement in the case of persons outside the workspace (212). As an alternative, it is possible that persons outside the workspace (212) are given increasingly higher relevance values the closer they are to the workspace (212). In this case, it is furthermore possible that the sum of the relevance values may be greater than 0 in order to evaluate the image classifier (60) as sufficiently safe for use.

What is claimed is:

1. A computer-implemented method for evaluating an image classifier, in which a classifier output of the image classifier is provided for an actuation of an at least semi-autonomous robot, the evaluation method comprising the following steps:
   ascertaining a first dataset, the first dataset including images, and annotations being assigned to the images, the annotations including information about scenes imaged in the respective images and/or about image regions to be classified and/or about movement information of the robot;
   ascertaining regions of the scenes that are reachable by the robot based on the annotations;
   ascertaining relevance values for image regions to be classified by the image classifier, wherein the image regions to be classified are assigned to an object in each case, and wherein the ascertaining of the relevance values includes the following steps:
      ascertaining depth information of the objects;
      determining a relationship between object positions and reachable regions based on the depth information; and
      ascertaining the relevance values based on the relationship;
   classifying the image data of the first image dataset using the image classifier; and
   evaluating the image classifier based on those of the image regions correctly classified by the image classifier and incorrectly classified image regions, and the ascertained relevance values of the image regions.

2. The method as recited in claim 1, wherein the ascertaining of the regions that are reachable by the robot is based on movement information of the robot.

3. The method as recited in claim 1, wherein the evaluating of the image classifier includes determination of an evaluation measure, and the method for evaluating the image classifier furthermore includes the following additional step:
   follow-up training of the image classifier based on a second image dataset when the evaluation measure is worse than a predefined evaluation threshold value.

4. The method as recited in claim 3, wherein the steps are iteratively repeated until a predefined number of iterations has been carried out and/or the predefined evaluation threshold value has been undershot.

5. The method as recited in claim 3, wherein the follow-up training of the image classifier is carried out based on relevance values of image regions of the second image dataset.

6. A computer-implemented method for operating an image classifier, the method comprising:
   providing the image classifier, the image classifier being evaluated by:
      ascertaining a first dataset, the first dataset including images, and annotations being assigned to the images, the annotations including information about scenes imaged in the respective images and/or about image regions to be classified and/or about movement information of the robot,
      ascertaining regions of the scenes that are reachable by the robot based on the annotations,
      ascertaining relevance values for image regions to be classified by the image classifier, wherein the image regions to be classified are assigned to an object in each case, and wherein the ascertaining of the relevance values includes the following steps:
         ascertaining depth information of the objects,
         determining a relationship between object positions and reachable regions based on the depth information, and
         ascertaining the relevance values based on the relationship,
      classifying the image data of the first image dataset using the image classifier, and
      evaluating the image classifier based on those of the image regions correctly classified by the image classifier and incorrectly classified image regions, and the ascertained relevance values of the image regions.

7. A control system for actuating an at least semi-autonomous robot, the control system comprising:
   an actuation system including a
      an image classifier, the image classifier being evaluated by:
         ascertaining a first dataset, the first dataset including images, and annotations being assigned to the images, the annotations including information about scenes imaged in the respective images and/or about image regions to be classified and/or about movement information of the robot;
         ascertaining regions of the scenes that are reachable by the robot based on the annotations;
         ascertaining relevance values for image regions to be classified by the image classifier, wherein the image regions to be classified are assigned to an object in each case, and wherein the ascertaining of the relevance values includes the following steps:
            ascertaining depth information of the objects;
            determining a relationship between object positions and reachable regions based on the depth information; and
            ascertaining the relevance values based on the relationship;
         classifying the image data of the first image dataset using the image classifier; and
         evaluating the image classifier based on those of the image regions correctly classified by the image classifier and incorrectly classified image regions, and the ascertained relevance values of the image regions;

wherein the control system is configured to forward image information based on sensor signals from a sensor to the image classifier, and/or an actuation signal is ascertained based on a classifier output, the actuation signal being used for actuating an actuator of the robot.

8. A training device configured to:

evaluate an image classifier, in which a classifier output of the image classifier is provided for an actuation of an at least semi-autonomous robot, the evaluating including:

ascertaining a first dataset, the first dataset including images, and annotations being assigned to the images, the annotations including information about scenes imaged in the respective images and/or about image regions to be classified and/or about movement information of the robot;

ascertaining regions of the scenes that are reachable by the robot based on the annotations;

ascertaining relevance values for image regions to be classified by the image classifier, wherein the image regions to be classified are assigned to an object in each case, and wherein the ascertaining of the relevance values includes the following steps:

ascertaining depth information of the objects;

determining a relationship between object positions and reachable regions based on the depth information; and ascertaining the relevance values based on the relationship;

classifying the image data of the first image dataset using the image classifier; and evaluating the image classifier based on those of the image regions correctly classified by the image classifier and incorrectly classified image regions, and the ascertained relevance values of the image regions, the evaluating of the image classifier including determining an evaluation measure;

wherein the training device is configured to perform a follow-up training of the image classifier based on a second image dataset when the evaluation measure is worse than a predefined evaluation threshold value.

9. A non-transitory machine-readable memory medium on which is stored a computer program for evaluating an image classifier, in which a classifier output of the image classifier is provided for an actuation of an at least semi-autonomous robot, the computer program, when executed by a computer, causing the computer to perform the following steps:

ascertaining a first dataset, the first dataset including images, and annotations being assigned to the images, the annotations including information about scenes imaged in the respective images and/or about image regions to be classified and/or about movement information of the robot;

ascertaining regions of the scenes that are reachable by the robot based on the annotations;

ascertaining relevance values for image regions to be classified by the image classifier, wherein the image regions to be classified are assigned to an object in each case, and wherein the ascertaining of the relevance values includes the following steps:

ascertaining depth information of the objects;

determining a relationship between object positions and reachable regions based on the depth information; and ascertaining the relevance values based on the relationship;

classifying the image data of the first image dataset using the image classifier; and evaluating the image classifier based on those of the image regions correctly classified by the image classifier and incorrectly classified image regions, and the ascertained relevance values of the image regions.

\* \* \* \* \*